US010486606B1

(12) United States Patent
Stabile

(10) Patent No.: US 10,486,606 B1
(45) Date of Patent: Nov. 26, 2019

(54) PORTABLE ORGANIZER

(71) Applicant: Jennie Stabile, Tarzana, CA (US)

(72) Inventor: Jennie Stabile, Tarzana, CA (US)

(*) Notice: Subject to any disclaimer, the term of this patent is extended or adjusted under 35 U.S.C. 154(b) by 0 days.

(21) Appl. No.: 16/423,496

(22) Filed: May 28, 2019

(51) Int. Cl.
B60R 7/04 (2006.01)
B60R 7/08 (2006.01)

(52) U.S. Cl.
CPC ............. B60R 7/043 (2013.01); B60R 7/08 (2013.01)

(58) Field of Classification Search
CPC .................................................. B60R 7/043
USPC ........................................ 224/275; D12/416
See application file for complete search history.

(56) References Cited

U.S. PATENT DOCUMENTS

| 2,953,288 | A | * | 9/1960 | Peterson | B60R 7/043 224/42.11 |
|---|---|---|---|---|---|
| D190,159 | S | * | 4/1961 | Goldstein | D2/864 |
| 3,014,759 | A | * | 12/1961 | Bing | B60R 7/043 297/188.06 |
| D292,347 | S | * | 10/1987 | Scott-Smith | D12/416 |
| 5,209,386 | A | * | 5/1993 | Allison | B60R 7/043 220/529 |
| 5,226,576 | A | * | 7/1993 | Ellsworth | B60R 7/043 224/275 |
| D344,180 | S | * | 2/1994 | Garcia | D12/416 |
| 5,354,119 | A | * | 10/1994 | Nicholas | B60R 7/043 224/275 |
| D411,354 | S | * | 6/1999 | Wilson | D3/328 |
| D417,062 | S | * | 11/1999 | Williams | D2/860 |
| 6,123,239 | A | * | 9/2000 | Lovitt | B62J 9/00 190/103 |
| D432,075 | S | * | 10/2000 | Hassett | D12/416 |
| 6,216,927 | B1 | * | 4/2001 | Meritt | B60R 11/02 224/275 |
| D447,999 | S | * | 9/2001 | Thomson | D12/416 |
| D498,585 | S | * | 11/2004 | Darling | D12/416 |
| 6,896,164 | B2 | * | 5/2005 | Fialla-Dori | B60R 7/043 224/275 |
| D560,912 | S | * | 2/2008 | Williams | D3/315 |
| D632,242 | S | * | 2/2011 | Currie | D12/416 |
| 7,891,733 | B1 | * | 2/2011 | Clarke | A47C 7/62 211/118 |
| D658,568 | S | * | 5/2012 | Currier | D12/416 |
| 8,807,406 | B1 | * | 8/2014 | Thach | A45F 5/00 224/153 |
| D842,590 | S | * | 3/2019 | Gillam | D2/864 |

(Continued)

Primary Examiner — Justin M Larson
(74) Attorney, Agent, or Firm — James M. Duncan, Esq.; Klein, DeNatale, Goldner

(57) ABSTRACT

A portable organizer has a parallelogrammical front panel and a parallelogrammical back panel in facing relation with the front panel. A left side panel connects a first edge of the front panel to a first edge of the back panel and a right side panel connects a second edge of the front panel to a second edge of the back panel. A bottom panel spans between a bottom edge of the front panel to a bottom edge of the back panel, and between a bottom edge of the left side panel to a bottom edge of the right side panel. A strap system secures the portable organizer to a backrest of a vehicle seat, where the strap system has a belt strap configured to encircle the backrest of the vehicle seat. The strap system also has left side and right side suspender suspender straps which further secure the portable organizer to the vehicle backrest.

18 Claims, 5 Drawing Sheets

(56) References Cited

U.S. PATENT DOCUMENTS

| | | | | |
|---|---|---|---|---|
| 2003/0230612 A1* | 12/2003 | Santos | ............... | A45C 9/00 |
| | | | | 224/585 |
| 2005/0023312 A1* | 2/2005 | Steinberg | ............... | B60R 7/043 |
| | | | | 224/275 |
| 2010/0282804 A1* | 11/2010 | Stimmell | ............... | F42B 39/08 |
| | | | | 224/585 |
| 2011/0101054 A1* | 5/2011 | Wicinski | ............... | B60R 7/043 |
| | | | | 224/275 |

\* cited by examiner

PORTABLE ORGANIZER

BACKGROUND OF THE INVENTION

Many persons use their private vehicles not only for transportation, but also as a temporary office. Realtors, attorneys, sales persons, estimators, contractors, repair people, etc. will review and fill out documents and forms within their vehicles. However, when a vehicle is employed for this use, the carrying, organizing, and accessing of papers and documents can present a unique set of challenges.

Loose lightweight items carried within the interior of a motor vehicle (whether automobile, truck private plane, helicopter) inevitably move around the interior of the vehicle as the vehicle is traveling. Papers and documents in particular will fly around the interior of the vehicle because of stops, starts, turns, open windows and ventilation systems. Papers placed in the right front passenger seat for convenient access by the driver will frequently slide off the seat into the front leg well when the vehicle brakes, making the papers unreachable by the driver. While a briefcase, box or other container may be utilized to contain papers and documents, many times a vehicle driver requires immediate access to a particular paper or document, which access is limited or frustrated by placing the papers and documents in such containers.

Boxes, brief cases and other containers are often placed on the front passenger seat for easy access by the driver. However, boxes, containers and similar devices may slide or move with movement of the vehicle. In addition, these devices must be removed from the seat if the driver wishes to make the passenger seat available for a passenger.

A person transporting papers and documents in a motor vehicle must also transport those papers and documents into the vehicle and out of the vehicle. If the documents are spread all over the interior of the vehicle, the documents must first be gathered prior to exiting the vehicle.

A device is desirable which: (1) enables a person to easily bring papers, documents, and other relatively small and lightweight items into a motor vehicle in an organized fashion; (2) prevents the papers, documents and other items from moving around in the interior of the vehicle during the operation of the vehicle; (3) allows easy access and organization of papers, documents and other items; (4) allows a passenger to sit in the front side passenger seat; (5) is restrained from moving around the interior of the vehicle; and (6) is easily attached and detached from the interior of the motor vehicle.

SUMMARY OF THE INVENTION

Embodiments of the present invention provide a solution to the above-identified need. An embodiment of the present invention is a portable organizer having a parallelogrammical front panel and a parallelogrammical back panel in facing relationship with the front panel. A left side panel connects a first edge of the front panel to a first edge of the back panel. Likewise, a right side panel connects a second edge of the front panel to a second edge of the back panel, and a bottom panel spans between a bottom edge of the front panel to a bottom edge of the back panel. The bottom panel further spans between a bottom edge of the left side panel and a bottom edge of the right side panel. A storage volume is defined by the front panel, the back panel, the left side panel, the right side panel, and the bottom panel.

An embodiment of the present invention further has a strap system which is configured to secure the portable organizer to a backrest of a vehicle seat, either with the storage volume against the front of the backrest or with the storage volume against the back of the backrest. The strap system has a belt strap configured to encircle the backrest of the vehicle seat. The strap system further has a left side suspender strap having a first end attached to the back panel and a second end attached to a first portion of the belt strap adjacent to the backrest. The left suspender strap has a left side length adjustment buckle. The strap system also has a right side suspender strap having a primary end attached to the back panel and a secondary end attached to a second portion of the belt strap adjacent to the backrest. The right suspender strap also has a right side adjustment buckle. It is to be appreciated that with this configuration, the strap system may be utilized to secure the portable organizer as a backpack by using the belt strap to secure the device around the waist of the user. The left side suspender strap may be used to secure the device to the user's left shoulder. Likewise, the right side suspender strap may be used to secure the device to the user's right shoulder.

The parallelogrammical front panel, the parallelogrammical back panel, the left side panel, the right side panel and the bottom panel may be fabricated from a variety of materials. Among these materials are soft materials such as leather, denim, suede, cotton fiber and polyester.

Among other features, embodiments of the present invention have the following characteristics: (1) the apparatus securely attaches to the seat to prevent its contents form shifting during vehicle movement; (2) the apparatus may be semi-permanently attached to the seat; (3) when the apparatus is not used, a person can sit in the passenger seat without obstruction or feeling discomfort; (5) the apparatus may have flexible dividers to allow customizing the compartments; (6) the apparatus has an adjustable strap system (belt and suspender) system to adapt to various seats and seat configurations; (7) the apparatus may have multiple compartments offering easy and predictable access to accessories, notebooks, bottles, purses, briefcases, etc.; (8) the apparatus is portable and can be carried around from a location or a vehicle to another through usage of the straps; (9) the bag material can be varied to allow container shape formation, better access, easier configuration changes, etc; (10) the apparatus design can be varied to allow better functionality for its purpose. (11). The strap system of the apparatus can be re-configured to adopt to the specific vehicle structure that the bag is being attached to, or the needs of the user, such as configuring embodiments of the apparatus to allow transition from a vehicle carrier to a backpack.

DETAILED DESCRIPTION OF THE INVENTION

Figure 1:
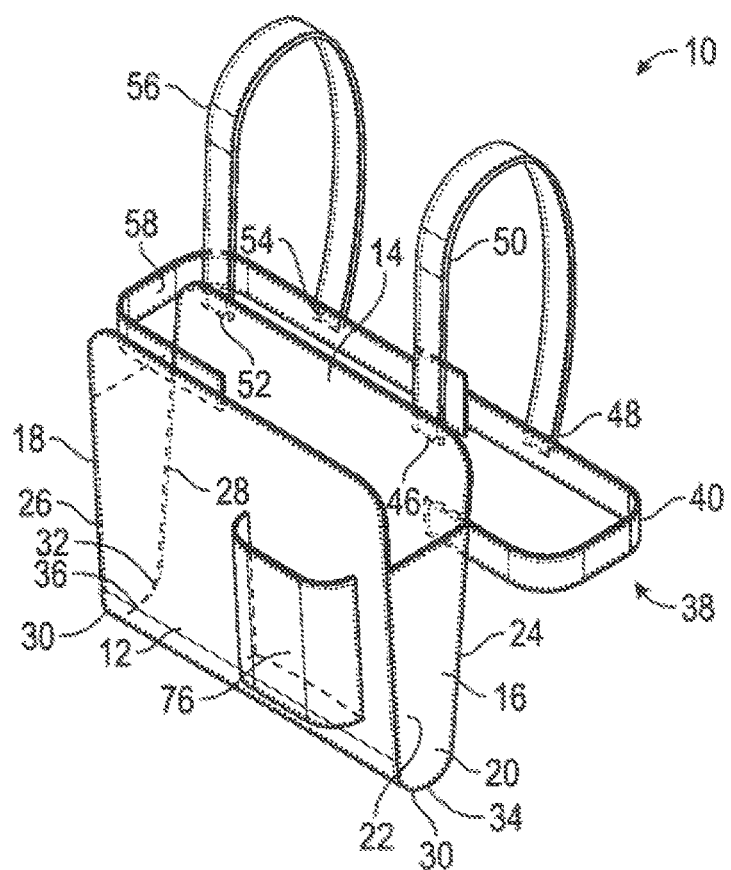
FIG. 1 depicts a perspective view of an embodiment of the presently disclosed portable organizer.

In describing embodiments of the disclosed invention, the terms "right", "left", "front", "back", "top", and "bottom" are used for the sake of convenience to conform with the orientation of the invention as depicted in the drawings. However, those terms are not intended to limit the scope, function and utility of the invention and are used only for the purpose of consistency of the text and claims with the drawing figures.

Figure 2:
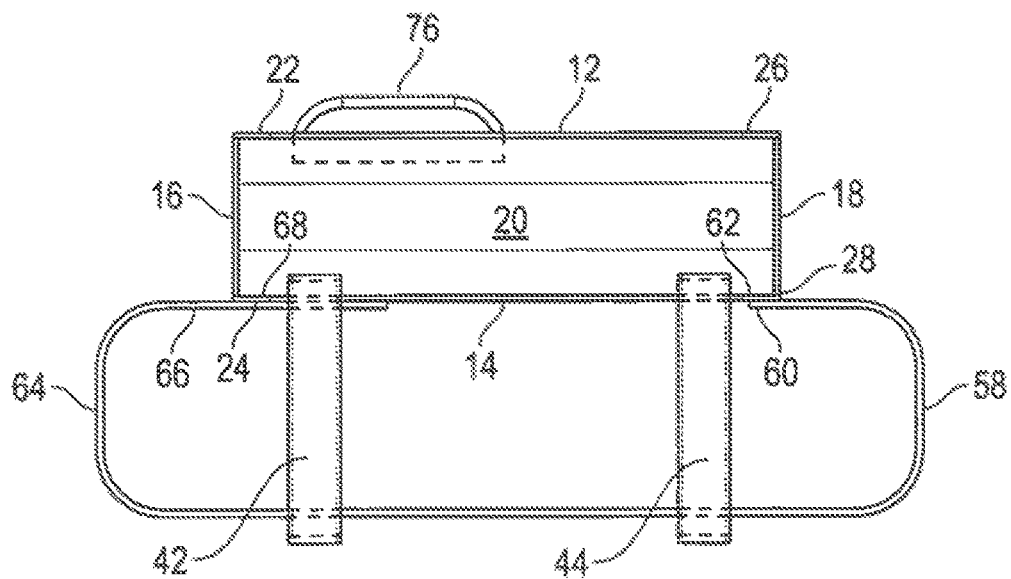
FIG. 2 depicts a top view of an embodiment of the presently disclosed portable organizer.
Figure 3:
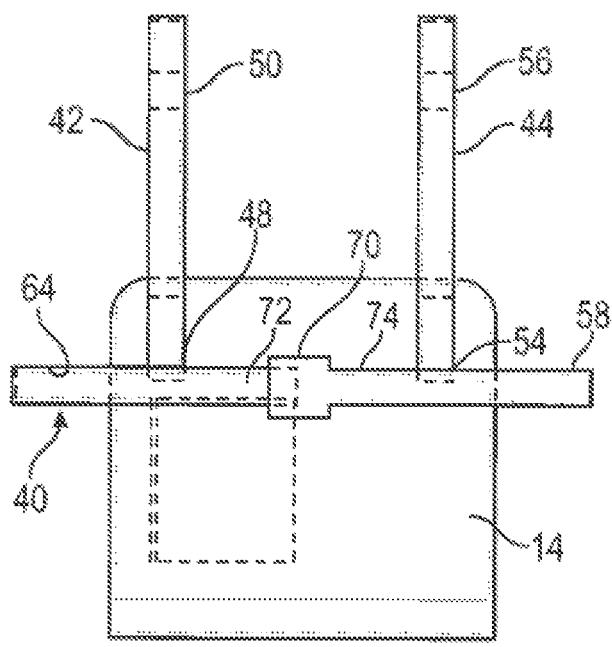
FIG. 3 depicts a rear view of an embodiment of the presently disclosed portable organizer.
Figure 4:
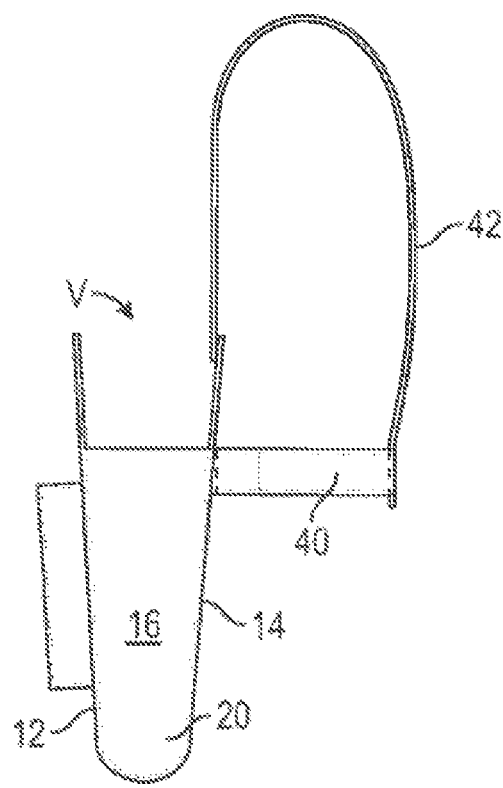
FIG. 4 depicts a side view of an embodiment of the presently disclosed portable organizer.

Turning now to the Figures, FIGS. 1-4 depict an embodiment of the presently disclosed portable organizer 10. As shown in the figures, portable organizer 10 has a parallelogrammical front panel 12, a parallelogrammical back panel 14 in facing relationship with the front panel, a left side panel 16, a right side panel 18 in facing relationship with the left side panel, and a bottom panel 20. It is to be appreciated that a single panel may be utilized to form the front panel 12, back panel 14 and bottom panel 20.

Left side panel 16 connects an edge 22 of front panel 12 to a corresponding edge 24 of back panel 14. Likewise, right side panel 18 connects an edge 26 of front panel 12 to a corresponding edge 28 of back panel 14. Bottom panel 20 spans between a bottom edge 30 of front panel 12 to a bottom edge 32 of back panel 14. Bottom panel 20 further spans between a bottom edge 34 of left side panel 16 and a bottom edge 36 of right side panel 18. A storage volume V is defined by the front panel 12, the back panel 14, the left side panel 16, the right side panel 18 and the bottom panel 20.

Portable organizer 10 has a strap system 38. Strap system 38 has a belt strap 40, a left side suspender strap 42, and a right side suspender strap 44. Left side suspender strap 42 has a first end 46 attached to back panel 14 and a second end 48 attached to a portion of belt strap 40. Left side suspender strap 42 has length adjustment buckle 50. Right side suspender strap 44 has a first end 52 attached to back panel 14 and a second end 54 attached to a portion of belt strap 40. Right side suspender strap 44 has length adjustment buckle 56.

Belt strap 40 may have a right side belt strap 58 having an end 60 attached to the right side 62 of back panel 14. Belt strap 40 may also have a left side belt strap 64 having an end 66 attached to left side 68 of back panel 14. A coupling mechanism 70 may be utilized for connecting an end 74 of right side belt strap 58 to an end 72 of left side belt strap 64. Coupling mechanism 70 may be hook and loop fasteners, a buckle, or other known devices for attaching ends of opposing straps. Right side belt strap 58 and left side belt strap 64 may be fabricated from an elastic material such that tension is required to connect end 60 to end 66, thereby maintaining tension in belt strap 40 after the ends are connected. Alternatively, adjustment buckles may be utilized to adjust the lengths of right side belt strap 58 and left side belt strap 64 to adjust it to the dimensions of a particular vehicle seat 100.

Figure 5:
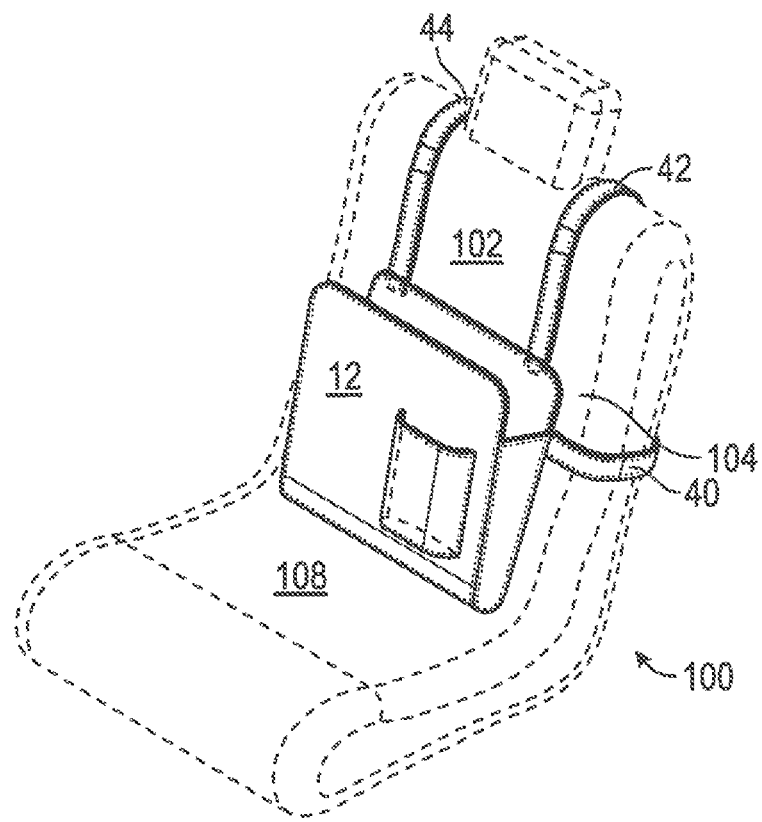
FIG. 5 depicts a perspective view of an embodiment of the presently disclosed portable organizer as attached to a seat of a vehicle.
Figure 6:
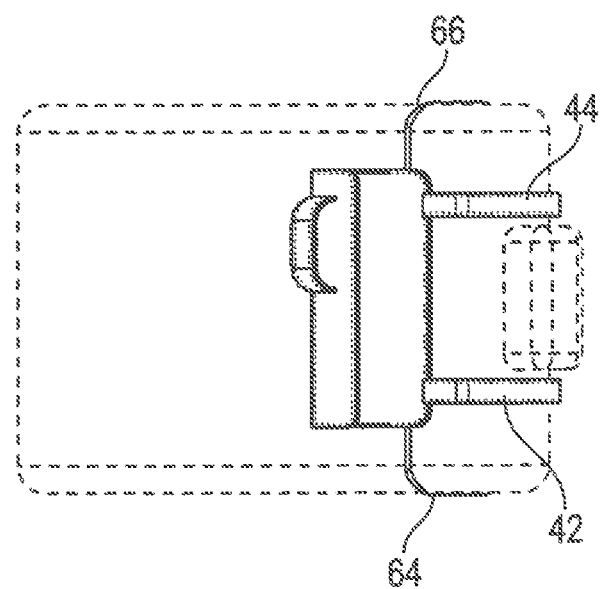
FIG. 6 depicts a top view of an embodiment of the presently disclosed portable organizer as attached to a seat of a vehicle.
Figure 7:
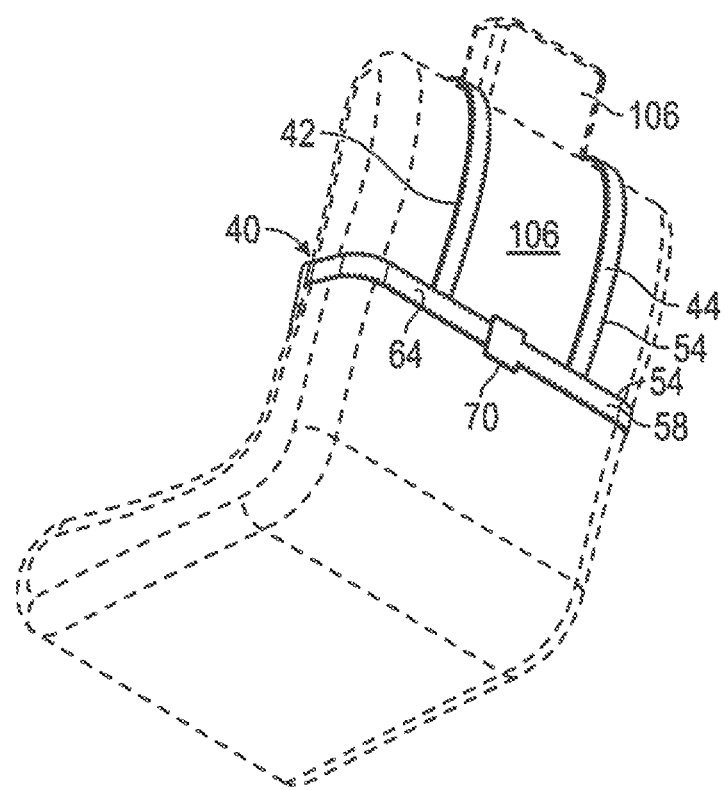
FIG. 7 depicts a rear perspective view of an embodiment of the presently disclosed portable organizer as attached to a seat of a vehicle.
Figure 8:
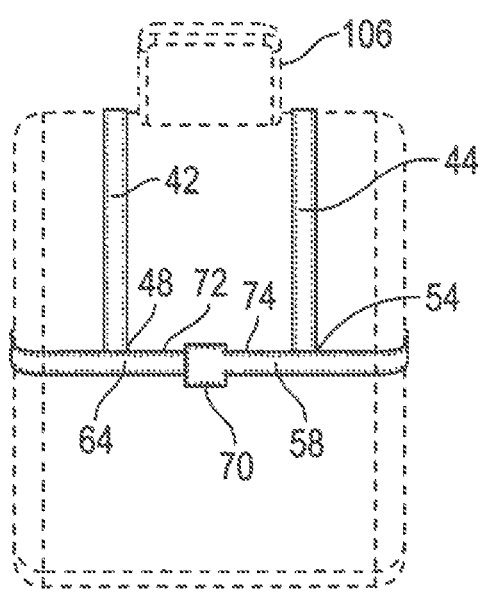
FIG. 8 depicts a rear view of an embodiment of the presently disclosed portable organizer as attached to a seat of a vehicle.
Figure 9:
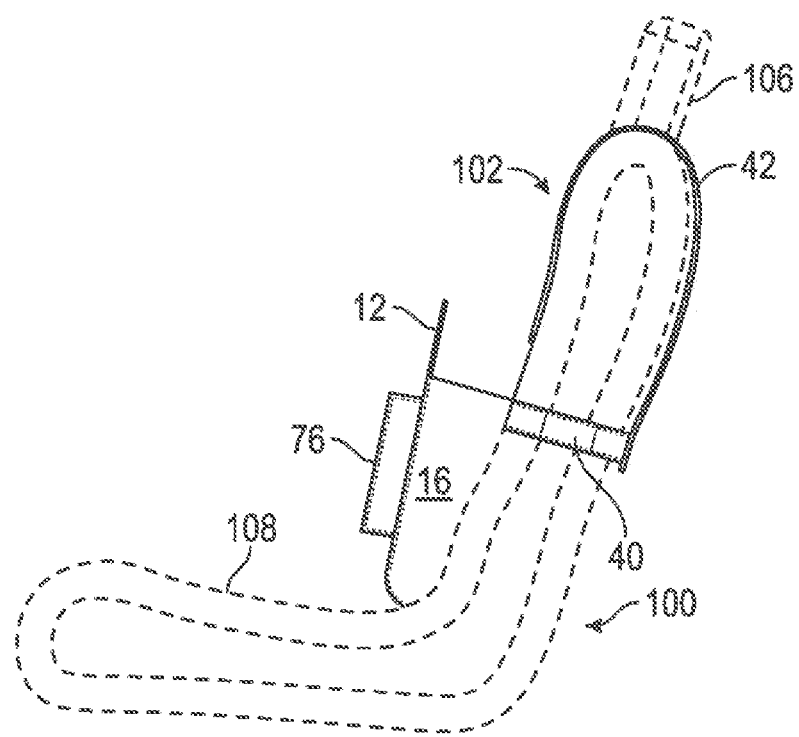
FIG. 9 depicts a side view of an embodiment of the presently disclosed portable organizer as attached to a seat of a vehicle.

FIGS. 5-9 depict a vehicle seat 100 with an embodiment of the portable organizer 10 attached to backrest 102, showing how belt strap 40 encircles backrest 102 from a backrest front 104 to a backrest back 106. As shown in the figures, left suspender strap 42 and right suspender strap 44 may be placed on either side of head rest 106 to further secure the position of the straps. While embodiments of the portable organizer 10 may be affixed directly to backrest 102 without support provided by seat cushion 108, bottom panel 20 may be configured to set upon and supported by seat cushion 108. In addition to the placement depicted in FIGS. 5-9, embodiments of the portable organizer 10 may be attached to a vehicle seat 100 with the back panel 14 disposed against backrest back 106 with belt strap 40 extending around back rest front 104. Attachment of the portable organizer 10 in this position allows a person in the back seat of the vehicle to have easy access to items stored within portable organizer 10.

It is to be appreciated that because of the relatively flat construction of portable organizer 10, if the portable organizer is fabricated from a soft and flexible material such as leather, denim, suede, cotton fiber, or polyester, a passenger could sit on vehicle seat 100 without having any particular discomfort so long as the portable organizer is utilized for storing documents only.

Embodiments of the portable organizer 10 have additional components to facilitate installation and organization of documents and other items which may be stored within the device. A pocket member 76 may be attached to an outside surface of front panel 12, where pocket member may be sufficiently sized to receive and secure water, soda, or wine bottles or to secure a mobile phone, tablet, writing implements, garage door opener, etc. Portable organizer 10 may also comprise one or more dividers to separate and organize documents and papers.

Having thus described the preferred embodiment of the invention, what is claimed as new and desired to be protected by Letters Patent includes the following:

1. A portable organizer comprising:
   a parallelogrammical front panel;
   a parallelogrammical back panel in facing relation with the front panel;
   a left side panel connecting a first edge of the front panel to a first edge of the back panel;
   a right side panel connecting a second edge of the front panel to a second edge of the back panel;
   a bottom panel spanning between a bottom edge of the front panel to a bottom edge of the back panel, the bottom panel further spanning between a bottom edge of the left side panel and a bottom edge of the right side panel, wherein a storage volume is defined by the front panel, the back panel, the left side panel, the right side panel, and the bottom panel; and
   a strap system configured to secure the portable organizer to a backrest of a vehicle seat, the strap system comprising a belt strap configured to encircle the backrest of the vehicle seat around a backrest front to a backrest back, the strap system further comprising a left side suspender strap having a first end attached to the back panel and a second end attached to a first portion of the belt strap adjacent to the backrest back, the left suspender strap comprising a left side length adjustment buckle, the strap system further comprising a right side suspender strap having a primary end attached to the back panel and a secondary end attached to a second portion of the belt strap adjacent to the backrest back, the right suspender strap comprising a right side adjustment buckle.

2. The portable organizer of claim 1 wherein the parallelogrammical front panel, the parallelogrammical back panel, the left side panel, the right side panel and the bottom panel comprise a soft material selected from the group consisting of leather, denim, suede, cotton fiber and polyester.

3. The portable organizer of claim 1 wherein the belt strap comprises a right side belt strap having a first end attached to a right side of the back panel and a left side belt strap having a first end attached to a left side of the back panel, and a coupling mechanism for connecting a second end of the right side belt strap to a second end of the left side belt strap.

4. The portable organizer of claim 1 further comprising a pocket member attached to an outside facing surface of the front panel.

5. The portable organizer of claim 1 further comprising a divider set within the storage volume.

6. The portable organizer of claim 1 wherein the bottom panel is configured to be set upon a seat cushion of the vehicle.

7. The portable organizer of claim 1 wherein the left side panel and the right side panel comprise a flexible material such that the storage volume may be increased or decreased as an item is inserted or removed from the portable organizer.

8. The portable organizer of claim 7 wherein a passenger may utilize the vehicle seat with the portable organizer secured to the backrest of the vehicle seat.

9. The portable organizer of claim 1 wherein the portable organizer converts to a backpack upon removal from the backrest of the vehicle seat.

10. The portable organizer of claim 1 wherein the front panel, the back panel, and the bottom panel are formed from a single contiguous panel.

11. A portable organizer comprising:
a parallelogrammical front panel;
a parallelogrammical back panel in facing relationship with the front panel;
a left side panel connecting a first edge of the front panel to a first edge of the back panel;
a right side panel connecting a second edge of the front panel to a second edge of the back panel;
a bottom panel spanning between a bottom edge of the front panel to a bottom edge of the back panel, the bottom panel further spanning between a bottom edge of the left side panel and a bottom edge of the right side panel, wherein a storage volume is defined by the front panel, the back panel, the left side panel, the right side panel, and the bottom panel; and
a strap system configured to secure the portable organizer to a backrest back of a vehicle seat, the strap system comprising a belt strap configured to encircle the backrest of the vehicle seat around the backrest back to a backrest front, the strap system further comprising a left side suspender strap having a first end attached to the back panel and a second end attached to a first portion of the belt strap adjacent to the backrest front, the left suspender strap comprising a left side length adjustment buckle, the strap system further comprising a right side suspender strap having a primary end attached to the back panel and a secondary end attached to a second portion of the belt strap adjacent to the backrest front, the right suspender strap comprising a right side adjustment buckle.

12. The portable organizer of claim 11 wherein the parallelogrammical front panel, the parallelogrammical back panel, the left side panel, the right side panel and the bottom panel comprise a soft material selected from the group consisting of leather, denim, suede, cotton fiber and polyester.

13. The portable organizer of claim 11 wherein the belt strap comprises a right side belt strap having a first end attached to a right side of the back panel and a left side belt strap having a first end attached to a left side of the back panel, and a coupling mechanism for connecting a second end of the right side belt strap to a second end of the left side belt strap.

14. The portable organizer of claim 11 further comprising a pocket member attached to an outside facing surface of the front panel.

15. The portable organizer of claim 11 further comprising a divider set within the storage volume.

16. The portable organizer of claim 11 wherein the left side panel and the right side panel comprise a flexible material such that the storage volume may be increased or decreased as an item is inserted or removed from the portable organizer.

17. The portable organizer of claim 11 wherein the portable organizer converts to a backpack upon removal from the backrest of the vehicle seat.

18. The portable organizer of claim 11 wherein the front panel, the back panel, and the bottom panel are formed from a single contiguous panel.

* * * * *